(12) United States Patent
Bauer et al.

(10) Patent No.: US 11,701,948 B2
(45) Date of Patent: Jul. 18, 2023

(54) INSERT FOR VEHICLE AIR CONDITIONER AND METHOD FOR PRODUCING SAME

(71) Applicant: IG Bauerhin GmbH, Grundau (DE)

(72) Inventors: Stefan Bauer, Alzenau (DE); Max-Florian Wolf, Hanau (DE)

(73) Assignee: I.G. BAUERHIN GMBH, Gruendau (DE)

( * ) Notice: Subject to any disclaimer, the term of this patent is extended or adjusted under 35 U.S.C. 154(b) by 0 days.

(21) Appl. No.: 17/000,695

(22) Filed: Aug. 24, 2020

(65) Prior Publication Data
US 2022/0169093 A1    Jun. 2, 2022

(30) Foreign Application Priority Data
Aug. 23, 2019  (DE) .......................... 202019003492.7

(51) Int. Cl.
*B60H 1/32*   (2006.01)
*B60H 1/00*   (2006.01)

(52) U.S. Cl.
CPC ....... *B60H 1/3229* (2013.01); *B60H 1/00521* (2013.01); *B60H 1/3227* (2013.01); *B60H 2001/3286* (2013.01)

(58) Field of Classification Search
CPC ................ B60H 1/3227; B60H 1/3229; B60H 1/00521; B60H 2001/3286
See application file for complete search history.

(56) References Cited

U.S. PATENT DOCUMENTS

| 5,002,336 | A  | * | 3/1991 | Feher | A47C 7/744 5/655.5 |
| 2005/0067862 | A1 | * | 3/2005 | Iqbal | A47C 7/72 297/180.11 |
| 2013/0187432 | A1 | * | 7/2013 | Marques | B60N 2/5891 297/452.62 |
| 2014/0252825 | A1 | * | 9/2014 | Amirault | B60N 2/2866 297/250.1 |
| 2015/0314716 | A1 | * | 11/2015 | Zimmann | B60N 2/5664 297/452.42 |
| 2018/0257524 | A1 | * | 9/2018 | Tuskes | B60N 2/5883 |
| 2020/0247342 | A1 | * | 8/2020 | Whitens | B33Y 10/00 |

\* cited by examiner

*Primary Examiner* — Marc E Norman
(74) *Attorney, Agent, or Firm* — TaeRa Franklin; Eckert Seamans Cherin & Mellott, LLC

(57) ABSTRACT

Inserts for the air-conditioning of a vehicle and methods for forming same are provided. In an exemplary embodiment, the insert includes a spacer material part. The spacer material part includes an open region extending from a top side to an opposite underside, the open region forming an air-guiding structure. The spacer material part is covered by at least one cover layer on at least one of the top side and the underside. The open areas of the air-guiding structure include a plurality of ducts connected to one another to form a net-like duct structure. The duct structure forms flow regions or flow zones. A cover layer has at least one perforation in the region of connection or intersection points of the ducts.

18 Claims, 3 Drawing Sheets

INSERT FOR VEHICLE AIR CONDITIONER AND METHOD FOR PRODUCING SAME

INTRODUCTION

The present invention relates to an insert for the air-conditioning of a vehicle and a method for manufacturing an insert for the air-conditioning.

Such inserts have at least one spacer material part in which open areas extending from one top side to an opposite bottom side are formed. These open areas form an air-guiding structure. The at least one spacer material part is covered on the top and/or bottom side by at least one cover layer.

Such inserts are not only used for the air-conditioning of a vehicle seat, but can also be used for the air-conditioning of, for example, interior trim parts of a vehicle.

Foam materials, fiber materials or so-called spacer fabrics are used for the spacer material part.

DE 20 2013 006 135 U1 describes an air-conditioning device for a vehicle seat, which has a spacer material part that forms at least part of an air distribution space. The spacer material is covered on the upper side with a top layer and on the opposite underside with an air-impermeable bottom layer. The top layer and the bottom layer are joined together around the outer circumference of the spacer material part. Furthermore, there is an air supply opening to the air distribution space as well as air outlet openings in the top layer to release air from the air distribution space. The top layer and the bottom layer are connected to each other around the outer circumference by a frame-shaped insert. A foam material or cellular rubber can be used for the frame-shaped insert. Within the spacer material part, which forms the air distribution space enclosed by the frame-shaped insert, so-called inlays can be used, i.e., island-like parts within which there are passage openings which continue in the top layer and, if necessary, also in the bottom layer. These through-holes in the inlays can, for example, serve as bracing openings for a seat cover.

DE 10 2009 009 057 A1 describes an air-conditioning device for a vehicle seat. On the underside of a cushion there is a recess which is covered by a barrier layer. On the inside of the barrier layer there are projections or spacer elements that extend from the barrier layer into the recess of the seat cushion. A separation layer is provided on the foam of the cushion, which defines the bottom surface of the recess on the side opposite the barrier layer, to separate the cushion from at least part of the air space. This separation layer can be foamed in when the cushion is foamed. A film, a textile, a knitted fabric and/or a non-woven fabric are specified as the material for the separation layer.

DE 10 2006 054 860 A1 describes an assembly for the air-conditioning of a seat, backrest or lying surface. The assembly can be used in a vehicle, for example, and has a core and a non-woven fabric or fabric layer that at least partially covers the core. The core contains several ducts which are open on the side facing the user and covered by the non-woven fabric or fabric layer. The ducts are connected to a fan.

SUMMARY

The present invention is based on the task of creating an insert for the air-conditioning of a vehicle, which is characterized by a simple construction and can be produced at low cost, and of specifying a method of manufacturing an insert for the air-conditioning of a vehicle, which can be produced simply and at low cost.

These tasks are solved by an insert with the features of Claim 1 as well as by a method with the features of Claim 10. Preferred embodiments are described in the dependent claims.

The insert according to the invention is characterized in that the open areas of the air-guiding structure comprise a plurality of ducts which, at least in partial areas of the at least one spacer material part, are connected to each other to form a net-like duct structure, forming flow areas or flow zones. An essential feature is that the at least one cover layer has at least one hole, which can also be described as a perforation, in the area of connecting or crossing points of the ducts. The air from the ducts of the air-guiding structure is discharged through these perforations to cool the intended zones of a vehicle. In this way it is possible, in particular, to define the points at which the air is discharged from the air-guiding structure, namely from the holes made in the at least one cover layer. Due to the fact that the holes in the at least one top layer are arranged at the connection or crossing points of the ducts, the air from several ducts is discharged in a mixed and regulated manner at the respective holes of the spacer material part.

Consequently, the open areas of the air-guiding structure comprise a plurality of ducts which are connected to each other at least in partial areas of the at least one spacer material part to form a net-like flow area or flow zones.

Preferably the ducts that run within the at least one spacer material part or within the layer of the at least one spacer material part are open from the top to the bottom of the spacer material part. With such a design, the ducts that are within the at least one spacer material part or within the layer of the at least one spacer material part are free of material from the top to the bottom of the at least one spacer material part. In particular, these ducts are only on one side of the at least one spacer material part at least partially covered by the at least one cover layer. This at least one cover layer then holds together the individual areas of the at least one spacer material part which are separated from each other by the ducts.

Another design of the insert provides for the use of at least two cover layers, which are arranged on the top and bottom of the at least one spacer material part. The separated areas are then held together by both cover layers. Similarly, it is also possible to arrange several cover layers on top of each other on only one side of the at least one spacer material part. In this case, the perforation is provided in the cover layers placed one above the other.

A further design of the insert is aimed at having a cover layer on one side of the at least one spacer material part, or several cover layers arranged one above the other with appropriate perforations. It is also intended to arrange a cover layer on the other side of the at least one spacer material part or to arrange several cover layers on top of each other which do not have a corresponding perforation, except for the one which is in flow connection with a fan.

In another preferred embodiment, at the junction between two or more ducts, a hole is formed extending from the top to the bottom of the at least one spacer material part, with a diameter of the hole being equal to or greater than the width of the respective ducts that run towards and open into this hole. Thus, at the junction between two or more ducts, a hole is formed extending from the top to the bottom of the at least one spacer material part. As a result, the ducts have a width equal to or less than the largest cross-sectional dimension of the respective connected hole. The width of the duct is a dimension perpendicular to the length of the duct, defined as the distance between two junctions each with a different duct, parallel to the top and/or bottom of the at least one spacer material part. The holes may have a round, circular or oval cross-section, or any other shape approximating to these cross-sectional shapes.

The cross-sectional dimension of the respective hole in the at least one cover layer corresponds to the cross-sectional dimension of the corresponding hole in the at least one spacer material part.

It is also intended that the respective ducts have a substantially constant width over their length.

A particularly preferred design of the at least one cover layer is that the at least one cover layer is perforated in the area of the respective holes according to the diameter of the respective hole in the at least one spacer material part.

The arrangement of the holes and the ducts can be compared with a two-dimensional atomic model in the plan view of the at least one spacer material part, with each hole having an n-fold bond corresponding to a number n, with n equal to 1, 2, 3, . . . , of ducts starting from a hole.

In one embodiment, the ducts extend in the at least one spacer material part up to the edge area of the at least one spacer material part. The edge area of the at least one spacer material part is defined as a circumferential surface that delimits the at least one spacer material part around the outer circumference, which is located between the top and bottom of the at least one spacer material part.

The sum of the areas of the opening cross-sections and the duct cross-sections per unit area of the at least one spacer material part can, in order to set an air flow from the at least one spacer material part over its area, increase with increasing distance from the area of an air supply. For this purpose, the opening cross sections and/or the duct cross sections can also be designed to increase with increasing distance from the area of the air supply.

In a preferred embodiment, the at least one spacer material part is formed from a foam material. A foam material is available at low cost and can be adjusted in its flexibility and air permeability in a defined way by the number and type of pores.

However, the use of a fiber material for at least one spacer material is also intended.

The top layer may consist of a tulle material applied as a thin layer to the at least one spacer material part.

Alternatively, at least one top layer can also be formed from a non-woven fabric, felt, plastic, foam rubber or elastomer. However, at least one cover layer made of a foam material, preferably of a closed-pore foam material which allows air to escape from the ducts of the at least one spacer material part only in the area of the holes or perforations of the at least one cover layer in the area of the respective connecting or crossing points of the ducts, or of a material which corresponds to a foam of the at least one spacer material part, is particularly preferred.

The at least one cover layer can be made thicker or higher than the at least one spacer material part to achieve more stability of the at least one spacer material part. The cover layer can also have a sandwich-like structure consisting of several cover layers arranged one above the other, which are formed from materials of the same type of material, but with different material properties. Alternatively, the cover layer can have a sandwich-like structure consisting of several cover layers arranged one above the other, which are made of different types of material. For example, a sandwich construction of a foam non-woven fabric is used.

In a preferred embodiment, several adjacent spacer material parts are provided, which divide the insert with respect to a surface area extension, with adjacent spacer material parts being arranged at a distance from each other, forming a duct-like intermediate space. The respective at least one cover layer of the respective adjacent spacer material parts are at least partially connected to each other and the cover layer spans the duct-like gap. The two cover layers of the respective adjacent spacer material parts can, for example, be glued together or the cover layers of the respective adjacent spacer material parts can be formed in one piece. Spanning the duct-like gap, also called the trench area, also means that the cover layer follows the contour of the trench or at least approximates the cross-sectional contour of the trench area. Advantageously, such a design is used for ventilated vehicle seats in which the central seat area and the lateral cheek areas are each spaced apart by a duct-like trench area.

In the method according to the invention for manufacturing an insert for the air-conditioning of a vehicle, advantageously in a first process step at least one spacer material part is provided and then ducts extending from the top side of the at least one spacer material part to a bottom side opposite the top side are inserted. In a subsequent process step, a cover layer is applied to the top side and/or the opposite bottom side of the at least one spacer material part. In a final process step, at least one hole is made in the at least one spacer material part and at least one perforation is made in the cover layer. The at least one hole in the at least one spacer material part and the at least one perforation in the at least one cover layer are formed simultaneously.

BRIEF DESCRIPTION

Further details and features of the invention are given in the following description of embodiments based on the drawing. In the drawings.

DETAILED DESCRIPTION

Figure 1:
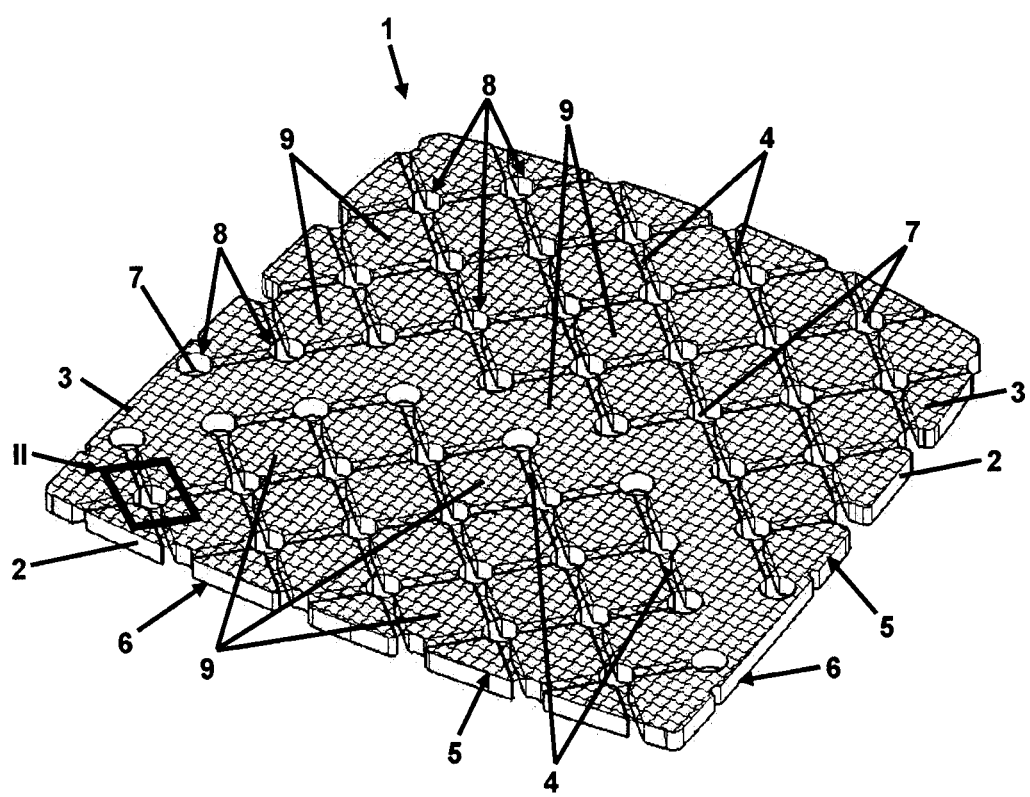
FIG. 1 shows a schematic, perspective view of an insert.

As the figures show, the insert 1 includes at least one spacer material part 2, which is covered with at least one cover layer 3 at least on one side.

The spacer material part 2 is interspersed with a plurality of ducts 4, which form a net-like duct structure. The ducts 4 extend from a top side 5 of the spacer material part 2, to which the cover layer 3 is attached, to an opposite bottom side 6 of the spacer material part 2.

At connection points or intersection points of adjacent ducts 4, there is a hole 7 in each spacer material part 2, which extends continuously from the top side 5 to the bottom side 6 in the spacer material part 2.

The spacer material part 2 is preferably made of a foam material. However, it is also intended that the spacer material part 2 consists of a fiber material, for example.

Through the choice of the duct structure, the at least one spacer material part 2 can be divided into flow areas or flow zones, which ventilate separated from each other only partial areas of a surface to be air-conditioned. The embodiment of an insert 1 shown in FIG. 1 is divided by the duct structure into a front flow area and a rear flow area separated from each other and is intended for example for the air-conditioning of a seat surface of a vehicle seat.

Figure 2:
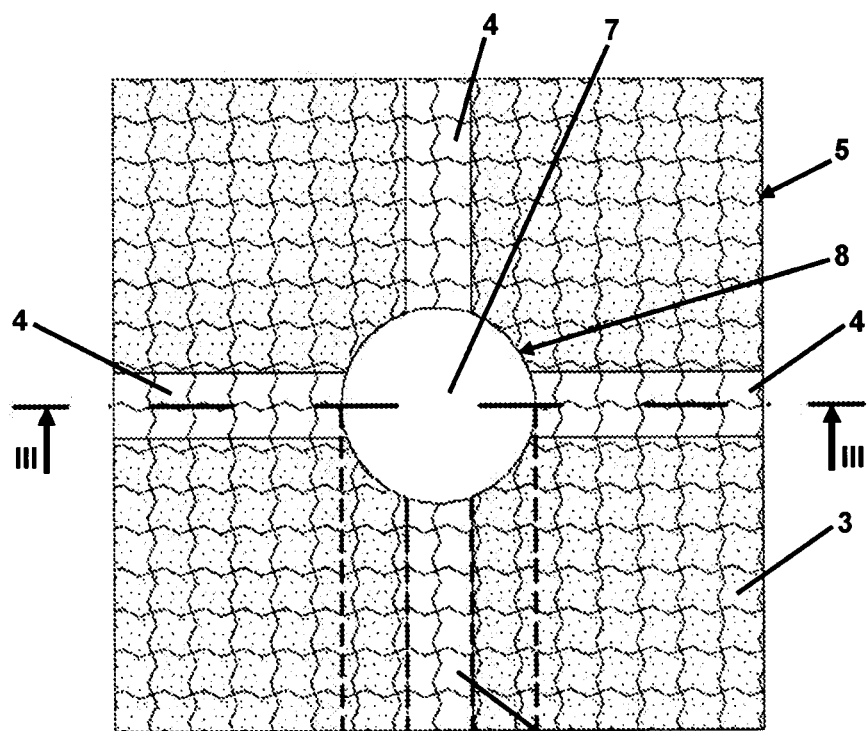
FIG. 2 shows an enlargement of area II in FIG. 1.
Figure 3:
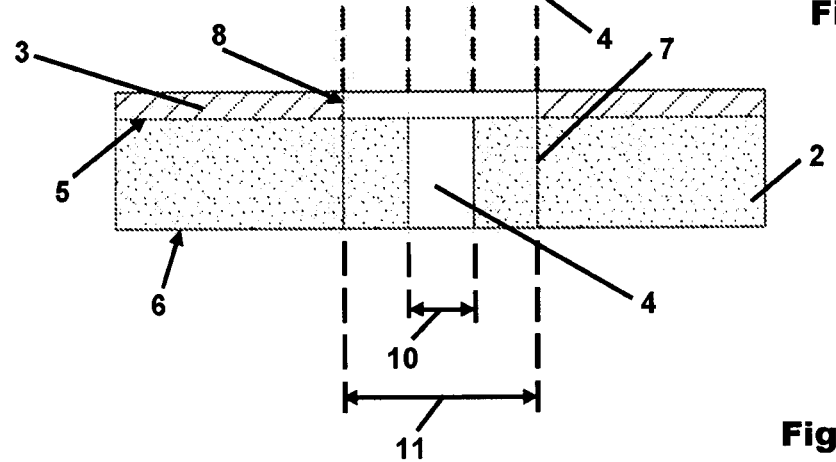
FIG. 3 shows a section along the section line III-III in FIG. 2.

As can be seen from FIG. 1, but in particular also from FIGS. 2 and 3, the at least one cover layer 3 has a perforation 8 in the area of hole 7 of the spacer material part 2, so that the at least one cover layer 3 is broken through at the points corresponding to the holes 7 of the at least one spacer material part 2.

Preferably, the holes 7 in the at least one spacer material part 2 continue into the hole 8 of the at least one cover layer 3 or the hole 8 in the at least one cover layer 3 is congruent with the holes 7 in the at least one spacer material part 2.

As a result of the ducts 4 arranged in net-like fashion, in the depicted embodiment in a rectangular or right-angled arrangement to each other, island-like areas 9 of the at least one spacer material part 2 are formed between the ducts 4, which are partially separated from each other, but which are held together by the at least one cover layer 3, which is attached, for example, to the top side 5 of the at least one spacer material part 2. It is also possible that the at least one cover layer 3 is not only attached to the top side 5 of the at least one spacer material part 2 but also to the bottom side 6 of the at least one spacer material part 2.

The respective ducts 4 have an essentially constant width 10 over their length. Furthermore, the figures show that the width 10 of the respective ducts 4 is smaller than the cross-sectional dimension 11 of the holes 7 in which the respective ducts 4 end. FIGS. 2 and 3 also show that the diameter of hole 8 of the at least one cover layer 3 corresponds to the diameter of hole 7 (half diameter) of the at least one spacer material part 2.

In the embodiment shown in FIG. 1, four, three or two ducts 4 are connected to each other via a hole 7. However, there are also ducts 4 which end in hole 7. Furthermore, there are ducts 4 which, starting from a hole 7, end in the area of the surface of the outer circumference 12 of the at least one spacer material part 2 and are thus open in the area of the outer circumference 12.

Figure 4:
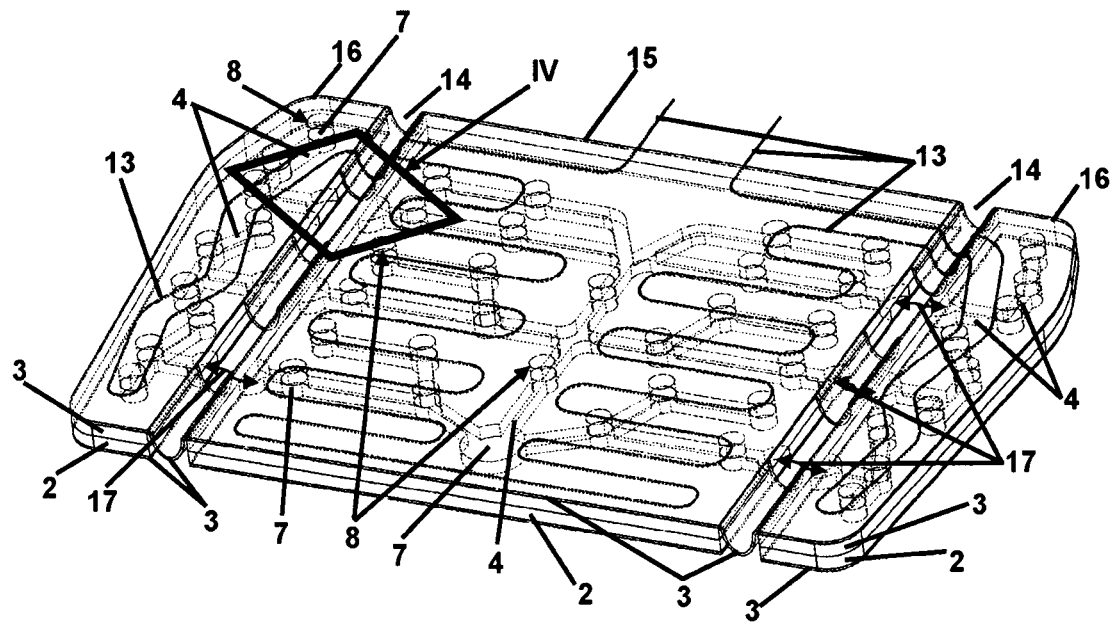
FIG. 4 shows a schematic, perspective design of the insert according to the invention with three spacer material parts.
Figure 5:
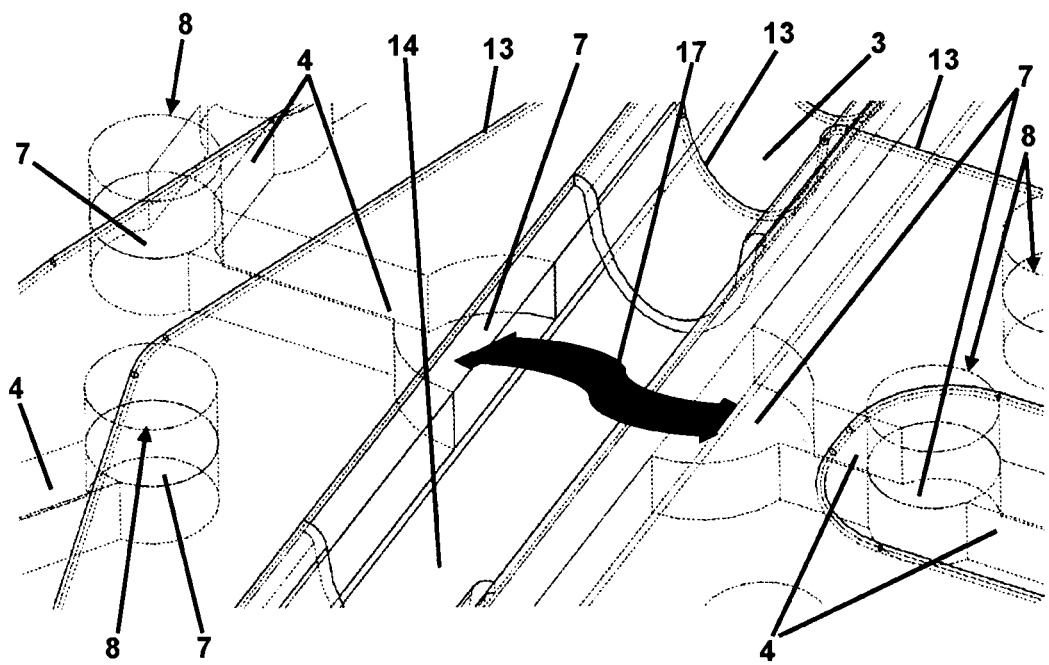
FIG. 5 shows an enlargement of area IV in FIG. 4.

However, it is also possible that two of the ducts 4 end in a half hole 7 in the edge area (outer circumference 12) of the at least one spacer material part 2. These half holes 7 are used in the area of duct-like trench areas 14, as shown in FIGS. 4 and 5 as an example. One half hole 7 is located in the edge area (outer circumference 12) of the at least one spacer material part 2 and the other half hole 7 is located in the edge area (outer circumference 12) of the at least one spacer material part 2 in the cheek area 16, preferably opposite. In other words, one half hole 7 in one edge area of the at least one spacer material part 2 (in the mirror area 15) is assigned to the other half hole 7 of the other edge area of the at least one spacer material part 2 (in the cheek area 16) in such a way that the two half holes are in flow connection for air in the installed state, indicated by the reference sign 17 in FIGS. 4 and 5.

In a preferred embodiment as shown in FIG. 4, several adjacent spacer material parts 2 are provided, which divide the insert with respect to a surface area extension indicated by a double arrow 18, with adjacent spacer parts 2 being arranged at a distance from each other, forming a duct-like intermediate space 14.

The term trench area 14 refers to spaced, duct-like areas that are known to exist, for example, in a vehicle seat and/or backrest cushion. As can be seen in FIGS. 4 and 5, trench areas 14 can exist, for example, between the mirror area 15 (central seat area or central backrest area) and the cheek areas 16 of a vehicle seat and/or vehicle backrest cushion. In addition, there may also be a trench area between the mirror area 16 and a seat depth adjustment area (not shown). The term seat depth adjustment refers to the front area of a vehicle seat, viewed in the direction of travel, on which the knee bends of a vehicle occupant are supported.

No spacer material part 2 is arranged in the trench areas 14, but it is not excluded either. The adjacent spacer material parts 2 are spaced apart from each other and form a duct-like gap 14 or trench area 14. The spaced, adjacent spacer material parts 2 are connected to each other by at least one cover layer 3, the at least one cover layer 3 extending over or through the gap 14 or the trench area 14. Thus, the trench area is bridged or spanned by the cover layer.

While the holes 7 in the at least one spacer material part 2 are shown in the figures as circular holes 7, they can also have a different cross-sectional shape, for example, an oval cross-sectional shape or an angular cross-sectional shape. In these cases, it is preferable to match the dimensions of the hole 8 in the cover layer 3 to the cross-sectional shape of the hole 7 in the at least one spacer material part 2.

A fan, although not shown in the figures, is positioned in a suitable place so that it supplies air to the duct structure of the respective ventilation zone or removes air from it. The fan can be directly or indirectly connected to the insert 1 by means of a coupling element.

In order to ensure a uniform air supply or air extraction when viewed over the area of the at least one spacer material part 2, the sum of the areas of the opening cross-sections of the holes 7 in the at least one spacer material part 2 and the sum of the duct cross-sections of the ducts 4 per unit area of the at least one spacer material part 2 is increased with increasing distance from the area of an air supply.

Although the cover layer 3 is presented as a net-like structure, in the form of a tulle material, for example, it is equally preferred to form at least one cover layer 3, as well as the at least one spacer material part 2, from a foam material or from a non-woven fabric. The at least one top layer 3 is preferably glued to the at least one spacer material part 2. This results in a cost-effective construction of the insert 1.

However, the at least one spacer material part 2 could also be made of a fiber material that has sufficient air permeability.

The depicted embodiment of the insert 1 also provides for the insertion of a heating conductor 14 between the at least one spacer material part 2 and the at least one cover layer 3. However, such a heating conductor 14 could also be integrated into the at least one cover layer 3, for example in such a way that heating conductor 14 is woven into the at least one cover layer 3. The heating conductor 14 could also be arranged on the side facing away from the spacer material part 2. The heating conductor 14 can be attached to the at least one top layer 3 by means of embroidery, sewing, knitting or bonding techniques.

The invention claimed is:

1. An insert for the air-conditioning of a vehicle, comprising:
   at least one spacer material part, the at least one spacer material part comprising an open region extending from a top side to an opposite underside, the open region forming an air-guiding structure, the at least one spacer material part being covered by at least one cover layer on at least one of the top side and the underside, wherein the open regions of the air-guiding structure comprise a plurality of ducts which, at least in partial areas at the least one spacer material part, the ducts being are connected to one another to form a duct structure, the duct structure forming flow regions, and wherein the at least one cover layer has at least one perforation in the region of connection or intersection points of the ducts, and wherein the junction between a first duct and a second duct of the plurality of ducts forms a hole extending from the top to the bottom of the at least one spacer part.

2. The insert of claim 1, wherein the ducts are open from a top to a bottom of the at least one spacer material part.

3. The insert of claim 2, wherein the junction between a first duct and a second duct of the plurality of ducts forms a hole extending from the top to the bottom of the at least one spacer material part.

4. The insert of claim 2, wherein the at least one spacer material part is formed from a foam material.

5. The insert of claim 4, wherein the at least one cover layer is formed from a tulle material.

6. The insert of claim 1, wherein the first duct and the second duct each has a width equal to or less than the largest cross-sectional dimension of the hole.

7. The insert of claim 6, wherein the at least one spacer material part is formed from a foam material.

8. The insert of claim 1, wherein the at least one cover layer is perforated in the region of the respective perforation according to the diameter of the hole in the at least one spacer material part.

9. The insert of claim 8, wherein the at least one spacer material part is formed from a foam material.

10. The insert of claim 1, further comprising a first adjacent hole formed from a third and fourth duct and a second adjacent hole formed from a fifth and sixth duct, wherein the hole is connected only to the first and second adjacent holes via at least two of the first duct, second duct, third duct, fourth duct, fifth duct, and sixth duct.

11. The insert of claim 10, wherein the at least one spacer material part is formed from a foam material.

12. The insert of claim 1, wherein the at least one spacer material part is formed from a foam material.

13. The insert of claim 1, wherein the at least one spacer material part is formed from a foam material.

14. The insert of claim 13, wherein the at least one cover layer is formed from a tulle material.

15. The insert of claim 1, wherein the at least one cover layer is formed from a tulle material.

16. The insert of claim 1, wherein the at least one cover layer is formed from a foam material.

17. The insert of claim 1, wherein at least one heating conductor is arranged under, in and/or on the at least one cover layer.

18. The insert of claim 1, wherein the at least one spacer material part is subdivided in a plurality of spacer material parts with respect to a surface area extension, wherein adjacent spacer material parts being arranged at a distance from one another to form a gap, and wherein at least one cover layer of the adjacent spacer material parts are at least partially connected to one another along the gap.

* * * * *